United States Patent
Aota et al.

(10) Patent No.: US 7,330,617 B2
(45) Date of Patent: Feb. 12, 2008

(54) WAVELENGTH SELECTIVE OPTICAL SWITCH, AND OPTICAL DEVICE PROVIDED WITH SPECTROSCOPIC FUNCTION

(75) Inventors: Hirofumi Aota, Kawasaki (JP); Kohei Shibata, Kawasaki (JP); Tamotsu Akashi, Kawasaki (JP); Shinji Yamashita, Kawasaki (JP); Tsuyoshi Yamamoto, Kawasaki (JP); Shinichi Takeuchi, Kawasaki (JP); Yoshinobu Kubota, Kawasaki (JP); Nobuhiro Fukushima, Kawasaki (JP); Hiroyuki Furukawa, Kawasaki (JP); Toshiya Kishida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/320,973

(22) Filed: Dec. 30, 2005

(65) Prior Publication Data
US 2007/0077003 A1 Apr. 5, 2007

(30) Foreign Application Priority Data
Sep. 30, 2005 (JP) ............................. 2005-288586

(51) Int. Cl.
*G02B 6/26* (2006.01)
(52) U.S. Cl. ............................. 385/18; 385/16; 385/17; 385/24; 385/25; 359/290; 359/291; 398/42; 398/43; 398/45; 398/46; 398/47; 398/48; 398/49; 398/50; 398/68

(58) Field of Classification Search .................. 385/24, 385/37, 34, 47, 16–18; 359/290–291, 627; 398/42–43, 45–50, 68
See application file for complete search history.

(56) References Cited

U.S. PATENT DOCUMENTS 6,549,699 B2 * 4/2003 Belser et al. ................. 385/24

(Continued)

FOREIGN PATENT DOCUMENTS

GB 2087095 5/1982

(Continued)

OTHER PUBLICATIONS

"The Art and Science of Optical Design" by R.R. Shannon, 1997.*

(Continued)

*Primary Examiner*—Brian Healy
*Assistant Examiner*—Guy G Anderson
(74) *Attorney, Agent, or Firm*—Staas & Halsey LLP

(57) ABSTRACT

A wavelength selective optical switch of the present invention separates a WDM light emitted from an input port of an input and output optical system, according to wavelengths, by a diffraction grating, and thereafter, condenses the lights of respective wavelengths on MEMS mirrors respectively corresponding to the respective wavelengths, in a mirror array, to reflect them by a condenser optical system, to thereby switch optical paths for the respective lights. The condenser optical system is configured by combining a plurality of lenses whose focal distances are different from each other, and positions in an optical axis direction of the lenses are adjustable by a slide mechanism. Thus, despite an error in the focal distances of the condenser lenses, in a mounting angle of a spectral element or the like, a beam pitch at the condensing positions of the lights of respective wavelengths can be coincident with a mirror pitch in the mirror array.

23 Claims, 14 Drawing Sheets

U.S. PATENT DOCUMENTS 6,657,771 B2 * 12/2003 Okayama .................... 359/290

FOREIGN PATENT DOCUMENTS

| JP | S57-054914 | 4/1982 |
|---|---|---|
| JP | H08-015625 | 1/1996 |
| JP | 2005-091930 | 4/2005 |

OTHER PUBLICATIONS

"Optical Engineering Fundamentals" by Bruce H. Walker, 1998.*

* cited by examiner (SIDE CROSS SECTION)

WAVELENGTH SELECTIVE OPTICAL SWITCH, AND OPTICAL DEVICE PROVIDED WITH SPECTROSCOPIC FUNCTION

BACKGROUND OF THE INVENTION

1. Field of the Invention

The present invention relates to a wavelength selective optical switch which separates a wavelength division multiplexed light for each wavelength by a spectral element, and thereafter, condenses the separated lights using lenses to reflect the condensed lights by movable mirrors, to thereby switch optical paths for the lights of respective wavelengths, and to an optical device provided with a spectroscopic function utilizing the lights of respective wavelengths condensed on the lenses.

2. Description of the Related Art

At present, the optical network with the wavelength division multiplexing (WDM) communication as the core thereof is being progressed at a high pace, in order to accommodate drastically increasing Internet traffics. The current WDM communication is in the network mode of point-to-point type. However, it is considered that, in the near future, the network mode of the WDM communication will be developed to the ring type network and the mesh-shaped network, and at each node configuring these networks, the processing, such as, the adding/dropping of arbitrary wavelengths, the all optical cross connecting (OXC) without the conversion into electricity and the like, will become possible, so that the dynamic setting/canceling of optical paths based on wavelength information will be performed (refer to the literature: "IP Over-photonic Network Vision (2) High Technology of Photonic Backbone Network" by Kenichi Satoh, et al., Journal of The Institute Of Electronics, Information And Communication Engineers, February 2002, pp. 94-103).

There has been proposed a wavelength selective optical switch as shown in FIG. 11 for example, as an optical switch capable to be arranged on each node of the photonic network which maximizes the optical technology as described in the above (refer to U.S. Pat. No. 6,549,699). This conventional wavelength selective optical switch comprises: an input and output optical system 110 consisting of an input port Pin and output ports Pout1 to Pout3; a spectral element 120; a condenser lens 130; a mirror array 140 in which a plurality of movable mirrors is arranged; and a base 150 on which the above described optical parts are mounted. In the wavelength selective optical switch having the above configuration, a WDM light input to the input port Pin is separated into lights of respective wavelengths by the spectral element 120. Thereafter, the separated lights are condensed by the condenser lens 130 on the movable mirrors respectively corresponding to the respective wavelengths, in the mirror array 140, and reflecting surface angles of the movable mirrors are controlled, so that reflected lights of respective wavelength are guided to arbitrary output ports Pout1 to Pout3, and the switching of optical paths for the respective wavelengths is performed.

As the spectral element 120 used in the conventional wavelength selective optical switch as described above, typically, a diffraction grating is utilized. The diffraction grating is an optical element made up by forming multiple parallel grooves uniformly on a glass substrate, and is capable of emitting lights of plural wavelengths which are incident at a fixed angle, at different angles for each wavelength utilizing an optical diffraction phenomenon. Therefore, the separation of wavelengths can be performed.

Further, as the mirror array 140, the one configured by arraying mirrors formed by the MEMS (Micro Electro Mechanical Systems) technology (to be referred to as MEMS mirrors hereafter) is typically utilized, and one MEMS mirror is arranged for the light of one wavelength separated by the spectral element 120. The MEMS mirror has a structure in which an inclination angle of the reflecting surface thereof is variable due to the electromagnetic force, and therefore, as shown in FIG. 12, the output port to which the reflected light is guided is decided according to the inclination angle of the reflecting surface.

One of the indexes showing the performance of the wavelength selective optical switch as described above is the transmission band. As shown in FIG. 13, this transmission band becomes broader, as a ratio (W/ω) between a beam diameter ω of the light condensed on the MEMS mirror corresponding to each wavelength and the mirror width W is larger and also the deviation of center wavelength is smaller. Namely, as the width W of the MEMS mirror is broader, the beam diameter ω on the MEMS mirror is smaller and also a condensing position of the light corresponding to each wavelength of the ITU grid is more coincident with the center of the MEMS mirror, the transmission band becomes broader. Here, the ITU grid is the wavelength standardized by the International Telecommunication Union. If the transmission band of the wavelength selective optical switch is broad, there are advantages in that an upper limit of bit rate capable to be coped with is increased and the number of multistage connections of the wavelength selective optical switches can be increased. In other words, if the transmission band of the wavelength selective optical switch is narrow, excellent transmission characteristics cannot be ensured.

In order to achieve the sufficient transmission band characteristics by the wavelength selective optical switch as described above, it is necessary to make the condensing positions of the lights corresponding to the respective wavelengths of the ITU grid coincident with the centers of the MEMS mirrors respectively corresponding to the wavelengths.

To be specific, as shown in FIG. 14 for example, provided that a certain wavelength of the ITU grid is made to be a reference wavelength $\lambda 0$ and a wavelength being $\pm i$-th ($i=1, 2, \ldots$) to the reference wavelength $\lambda 0$ is represented by $\lambda \pm i$, when the WDM light containing the lights of the wavelengths $\lambda 0$ and $\lambda \pm i$ is given at an incident angle $\alpha$ to the spectral element 120 which uses the diffraction grating, an angle $\theta i$ between the light of the wavelength $\lambda 0$ and the light of the wavelength $\lambda + i$ emitted from the diffraction grating is expressed in accordance with the following formula (1).

$$\theta i = \text{Arc Sin}(N \times \lambda i - \text{Sin } \alpha) - \text{Arc Sin}(N \times \lambda 0 - \text{Sin } \alpha) \quad (1)$$

In the above formula, N is the number of grooves per 1 mm of the diffraction grating, and the order of diffraction is the first order.

Based on the relationship in the formula (1), an interval Xi between the lights of the wavelengths $\lambda 0$ and $\lambda i$ condensed on the mirror array 140 (to be referred to as a beam pitch hereafter) can be obtained by the following formula (2), provided that a focal distance of the condenser lens 130 is f.

$$Xi = f \times \theta i = f \times \{\text{Arc Sin}(N \times \lambda i - \text{Sin } \alpha) - \text{Arc Sin}(N \times \lambda 0 - \text{Sin } \alpha)\} \quad (2)$$

In the above formula (2), since $\lambda 0$ and $\lambda i$ are always fixed, the beam pitch Xi of the lights condensed on the mirror array 140 serves as a function for the focal distance f of the condenser lens, the number of grooves N of the diffraction grating and the incident angle α of the WDM light. Accordingly, a distance X0i between the MEMS mirror corresponding to the wavelength λ0 and the MEMS mirror corresponding to the wavelength λi (to be referred to as a mirror pitch hereafter) is decided to be coincident with the beam pitch for the case where the focal distance f, the number of grooves N and the incident angle α become ideal values f0, N0 and α0. Namely, the mirror pitch X0i is previously designed in accordance with the following formula (3).

$$X0i = f0 \times \{\text{Arc Sin}(N0 \times \lambda i - \text{Sin } \alpha 0) - \text{Arc Sin}(N0 \times \lambda 0 - \text{Sin } \alpha 0)\} \quad (3)$$

However, in the conventional wavelength selective optical switch as described in the above, if an error occurs in the focal distance f of the condenser lens, in the number of grooves N of the diffraction grating, or in the incident angle α of the WDM light, since the deviation occurs between the beam pitch of the lights of respective wavelengths actually condensed on the mirror array 140 and the mirror pitch of the MEMS mirrors in the mirror array 140, there is caused a problem of the degradation of the transmission band. Since each MEMS mirror arranged on the mirror array 140 is formed by performing the fine processing, such as etching or the like, on a silicon substrate, it is hard that the mirror array 140 in itself has a mechanism for adjusting the mirror pitch.

Namely, in order to achieve the sufficient transmission band characteristics in the conventional wavelength selective optical switch, the beam pitch of the lights condensed on the mirror array 140 needs to be always coincident with the mirror pitch in the mirror array 140. As a method of realizing such necessity, there is considered, for example, a method of tightening the tolerance of the focal distance f, the number of grooves N and the incident angle α up to a degree at which the degradation of the transmission band is allowable. Further, there is considered a method of correcting the error as described above by disposing a rotation mechanism to the diffraction grating to make the incident angle α variable, even if the error occurs in the focal distance f or in the number of grooves N.

However, in both of the above described methods of making the beam pitch Xi coincident with the mirror pitch X0i, there still remains a common problem in that the precision required to the incident angle α is significantly strict. For example, in the case where the focal distance f of the condenser lens is 100 mm, the number of grooves N of the diffraction grating is 1800 /mm, the incident angle α is 66.50°, the usable wavelength range of the WDM light is C-band (1530 to 1565 nm), the wavelength spacing is 100 GHz and the number of wavelengths is 44 waves, if the degradation of the transmission band is to be suppressed to 3 GHz or less, the precision required to the incident angle α is 0.01° or so. Such precision of the incident angle α is hard to be realized even if the diffraction grating is fixedly mounted as in the former method, or even if the rotation mechanism is disposed to the diffraction grating as in the latter method. Even if the precision of the incident angle α could be realized at 0.05° by adjusting the diffraction grating by the rotation mechanism, the degradation of the transmission band at that time is 15 GHz or more, and such a value is problematic in the operation of the wavelength selective optical switch.

In fact, in the conventional wavelength selective optical switch, there has been a problem in that the degradation of the transmission band is significant in the typically realizable mounting precision and adjusting precision, and therefore, the sufficient characteristics as the wavelength selective optical switch cannot be achieved.

SUMMARY OF THE INVENTION

The present invention has been accomplished in view of the above problems, and has an object to provide a wavelength selective optical switch capable of making a beam pitch at condensing positions of lights of respective wavelengths coincident with a mirror pitch of a mirror array. Further, the present invention has an object to provide an optical device provided with a spectroscopic function capable of separating lights of respective wavelengths from a WDM light with the high condensing position precision, by applying a configuration of the wavelength selective optical switch.

In order to achieve the above objects, the present invention provides a wavelength selective optical switch comprising: an input and output optical system in which an input port and a plurality of output ports are arranged in a first direction; a spectral element which separates a wavelength division multiplexed light containing a plurality of lights of different wavelengths, which is emitted from the input port in the input and output optical system, according to the wavelengths, to a second direction which is different from the first direction; a condenser optical system which condenses the lights of respective wavelengths separated by the spectral element on different positions; and a mirror array including a plurality of movable mirrors whose angular variable reflecting surfaces are arranged on the condensing positions of the lights of respective wavelengths condensed by the condenser optical system, in which angles of the reflecting surfaces of the movable mirrors are controlled, so that the lights of respective wavelengths reflected by the respective movable mirrors are guided, via the condenser optical system and the spectral element, to the output port which is set as the output determination of the respective wavelengths, among the plurality of output ports in the input and output optical system, wherein the condenser optical system includes a plurality of lenses whose focal distances are different from each other, and is provided with a slide mechanism which makes at least one of the plurality of lenses movable in parallel to an optical axis direction which is orthogonal to the first and second directions.

In the wavelength selective optical switch having the above configuration, the WDM light emitted from the input port in the input and output optical system is separated by the spectral element, according to the wavelengths, to the second direction, and thereafter, the lights of respective wavelengths pass through the plurality of lenses in the condenser optical system, to be condensed on the movable mirrors corresponding to the respective wavelengths, in the mirror array. At this time, since at least one of the plural lenses in the condenser optical system is made movable in parallel to the optical axis direction by the slide mechanism, a position in the optical axis direction of this lens is adjusted so that a beam pitch on the condensing positions of the lights of respective wavelengths is made coincident with the mirror pitch of the mirror array. The lights of respective wavelengths condensed on the mirror array are reflected by the movable mirrors corresponding to the wavelengths, to be guided, via the condenser optical system and the spectral element, to the output port which is set as the output determination in the input and output optical system.

According to the wavelength selective optical switch of the present invention as described above, the condenser optical system is configured by combining the plural lenses whose focal distances are different from each other, and at least one of the lenses is made movable in parallel to the optical axis direction by the slide mechanism. Therefore, despite an error in the focal distances of the plural lenses, in a mounting angle of the spectral element or the like, the beam pitch on the condensing positions of the lights of respective wavelengths can be made coincident with the mirror pitch of the mirror array. Consequently, it becomes possible to easily manufacture the wavelength selective optical switch which realizes the excellent transmission band.

The other objects, features and advantages of the present invention will be apparent from the following description of the embodiments with reference to the accompanying drawings.

DETAILED DESCRIPTION OF THE INVENTION

Figure 1:
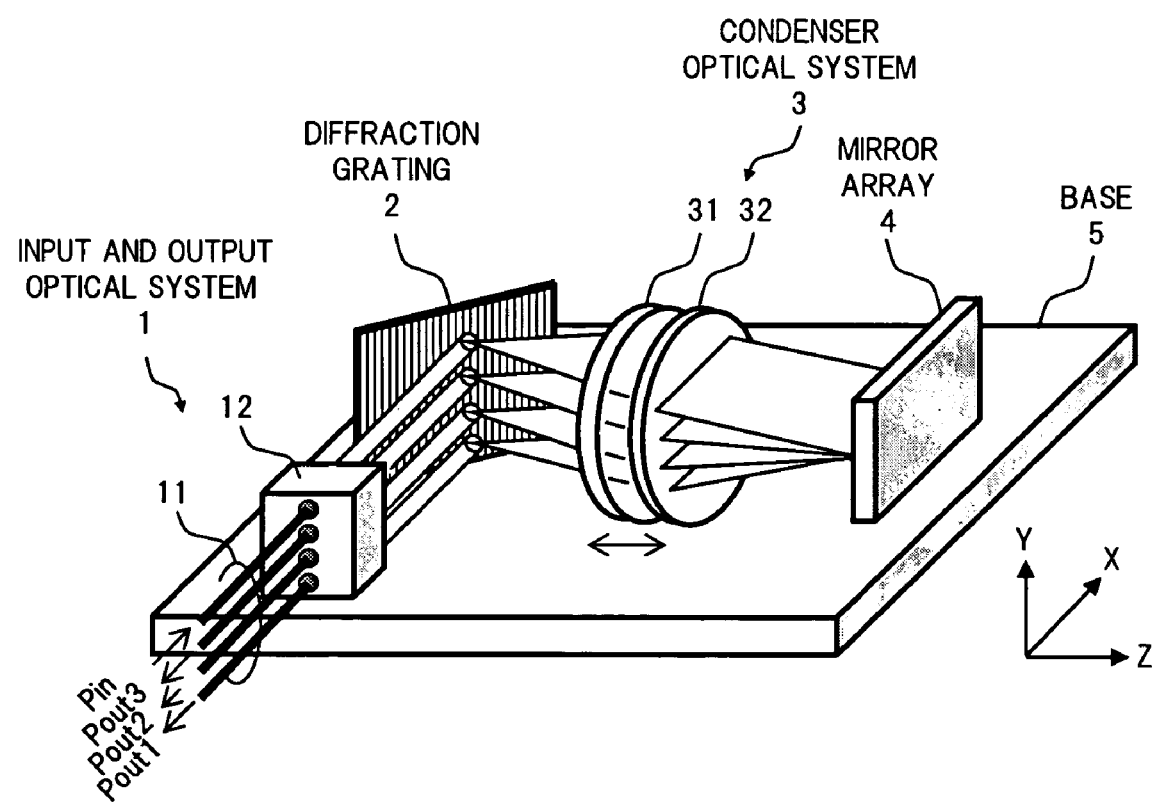
FIG. 1 is a perspective view showing the entire configuration of a wavelength selective optical switch according to one embodiment of the present invention.

Hereinafter, embodiments of the present invention will be described with reference to drawings. The same reference numerals denote the same or equivalent parts in all drawings.

FIG. is a perspective view showing the entire configuration of a wavelength selective optical switch according to one embodiment of the present invention. Further, FIG. 2 is a diagram for explaining features of optical systems in the configuration of FIG. 1.

Figure 2:
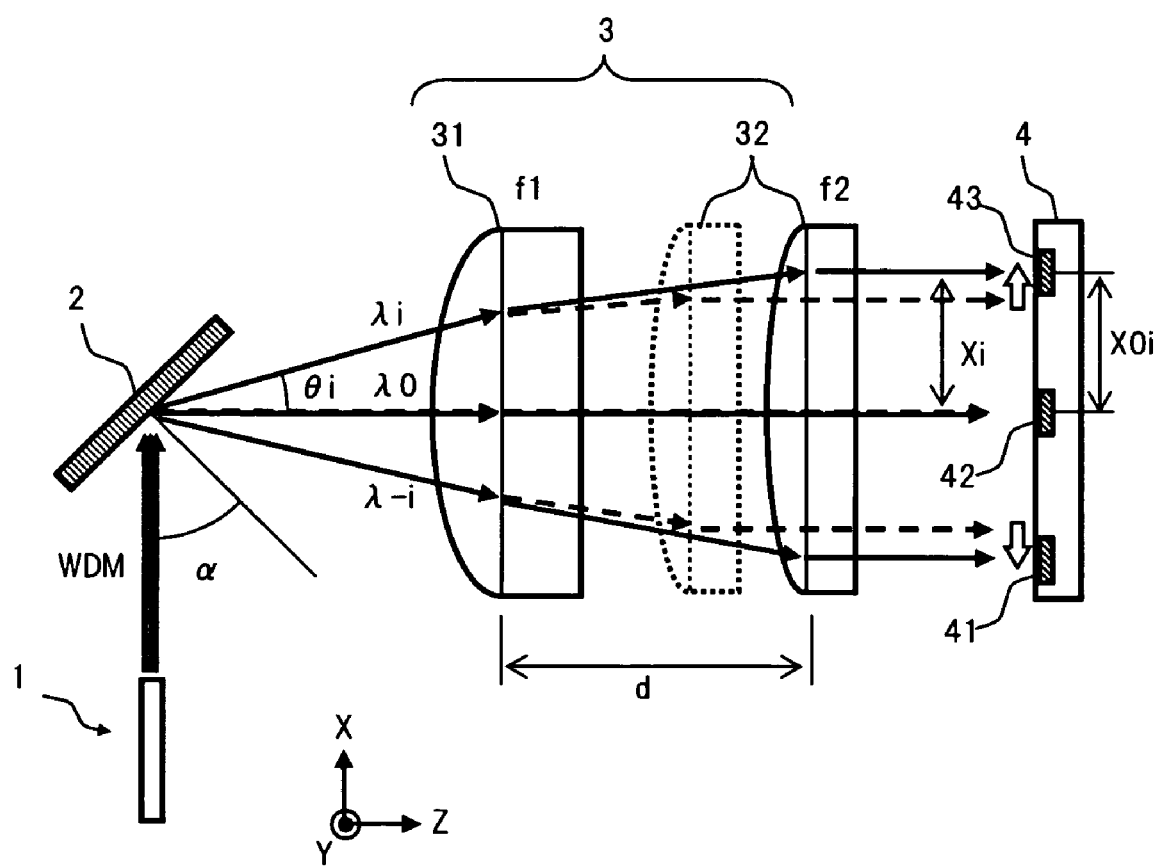
FIG. 2 is a diagram for explaining features of optical systems in the configuration of FIG. 1.

In FIG. 1 and FIG. 2, the present wavelength selective optical switch comprises, for example: an input and output optical system 1 in which an input port Pin and output ports Pout1 to Pout3 are arranged in a first direction (Y-direction); a diffraction grating 2 serving as a spectral element, which separates a WDM light emitted from the input port Pin of the input and output optical system 1, according to wavelengths, to a second direction (X-direction); a condenser optical system 3 consisting of a combination of plural lenses (for example, two lenses, here); a mirror array 4 in which a plurality of MEMS mirrors 41 to 43 is arranged corresponding to condensing positions of the lights of respective wavelengths condensed by the condenser optical system 3; and a base 5 on which the above optical parts are mounted.

The input and output optical system 1 includes, for example, a fiber array 11 in which four optical fibers are arranged in the Y-direction and a lens array 12 in which collimator lenses are arranged in the vicinity of end faces of the respective optical fibers. Here, one optical fiber in the fiber array 11, which is positioned on the upper side in the figure, is set as the input port Pin, and the remaining three optical fibers are set as the output ports Pout1 to Pout3. Note, the number of optical fibers and the setting of the input and output ports are not limited to the above example.

The diffraction grating 2 is given with the WDM light which is input to the input port Pin and is converted into a parallel light by the collimate lens, at an incident angle α, and emits lights of respective wavelengths contained in the WDM light at different angles for each wavelength with respect to the X-direction. This diffraction grating 2 on which grooves of the number of N/mm are formed, is fixed at a predetermined position on the base 5.

The condenser optical system 3 is configured by combining a lens 31 having a focal distance f1 and a lens 32 having a focal distance f2 which is longer than the focal distance f1 of the lens 31. The lights of respective wavelengths separated by the diffraction grating 2 pass through the lenses 31 and 32 sequentially, to be condensed on the MEMS mirrors respectively corresponding to the respective wavelengths, in the mirror array 4, and the lights respectively reflected by the MEMS mirrors pass through the lenses 32 and 31 sequentially, to be condensed on the diffraction grating 2. The lenses 31 and 32 are fixed on the base 5 via a slide mechanism (to be described later) capable of moving in parallel to an optical axis direction (Z-direction) orthogonal to the X-direction and Y-direction. The focal distance f2 of the lens 32 is preferably set to be 5 times or more the focal distance f1 of the lens 31, and here, f1:f2=1:10, for example. However, a ratio between f1 and f2 is not limited to this example.

Further, as the lens 31 on the shorter focal side, it is desirable to use an aspherical lens whose spherical aberration is corrected or a gradium lens. Thus, it becomes possible to reduce the spherical aberration of the condenser optical system 3, to thereby condense the lights of respective wavelengths on the corresponding MEMS mirrors in the mirror array 4 at substantially one point. Namely, in the case where the ratio between the focal distances f1 and f2 of the two lenses is set at 1:10 or so, as described in the above, the lens 32 on the longer focal side hardly contributes to the spherical aberration. Therefore, it becomes possible to reduce the spherical aberration of the entire condenser optical system 3, by using the lens whose spherical aberration is corrected, for the lens 31 on the shorter focal side.

In the mirror array 4, the plural MEMS mirrors 41, 42 and 43 corresponding to the maximum number of wavelengths of the WDM light, which can be input to the input port Pin, are arranged in the X-direction. An interval (mirror pitch) X0i between the MEMS mirror 42 corresponding to the reference wavelength λ0 and the MEMS mirror 43 corresponding to the wavelength λi is previously designed in accordance with the formula (3) described above. Reflecting surfaces of the MEMS mirrors 41 to 43 can be inclined with a torsion bar parallel to the X-direction as the center, and inclination angles of the reflecting surfaces are controlled in accordance with drive signals from a drive circuit (not shown in the figure).

Figure 3:
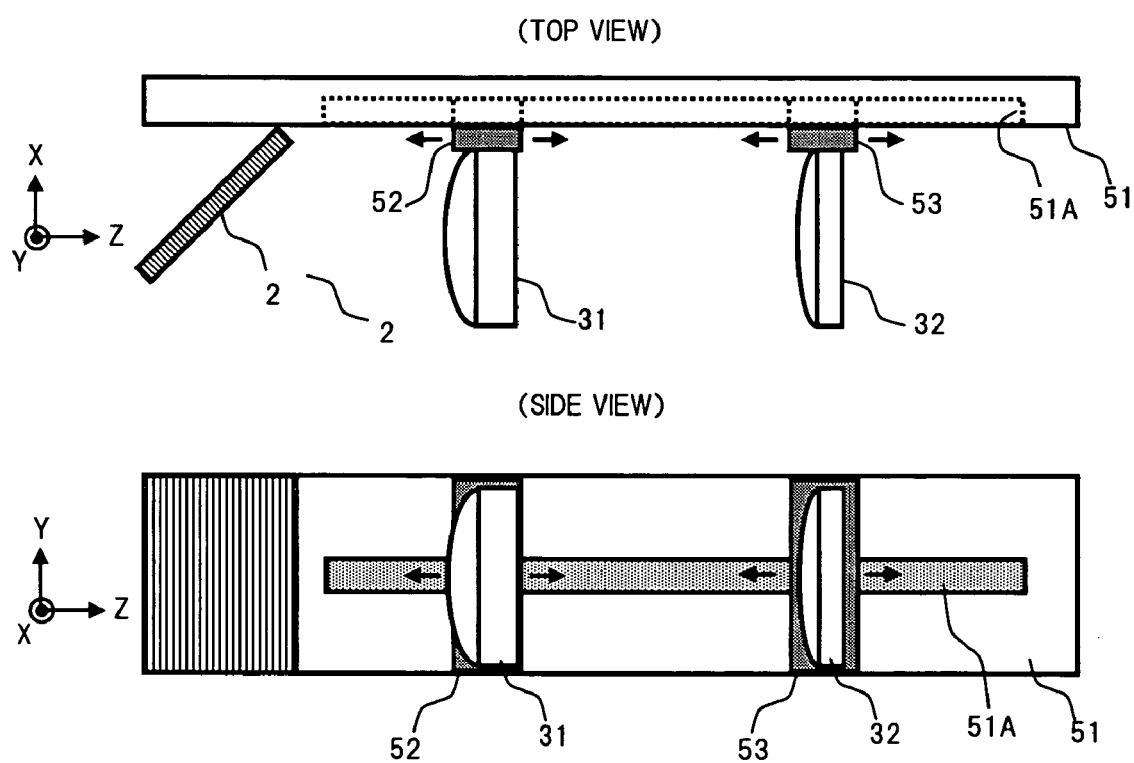
FIG. 3 is a diagram showing a configuration example of a slide mechanism used in the embodiment.
Figure 4:
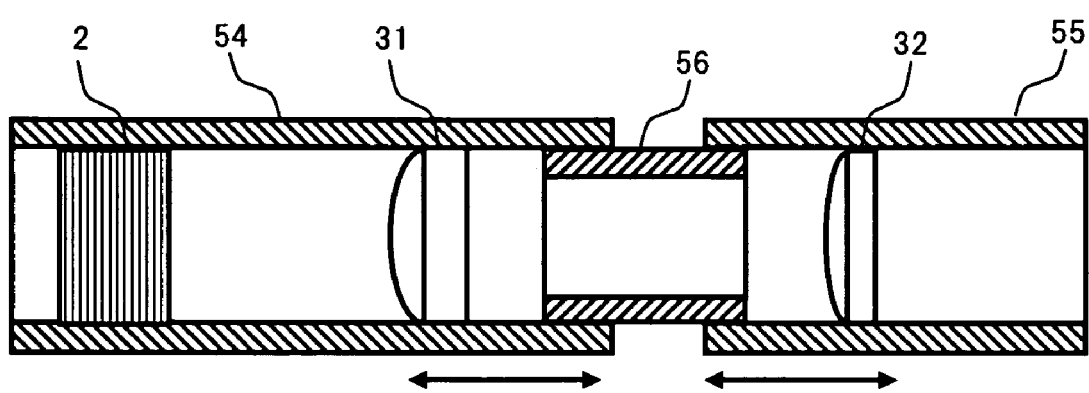
FIG. 4 is a diagram showing another configuration example of the slide mechanism used in the embodiment.

On the base 5, the input and output optical system 1, the diffraction grating 2 and the mirror array 4 are respectively fixed at predetermined positions, and also the condenser optical system 3 is fixed at a predetermined position via the slide mechanism. It is possible to make the slide mechanism to be in a frame type configuration as shown in FIG. 3 or in a cylindrical type configuration as shown in FIG. 4. To be specific, the frame type slide mechanism in FIG. 3 includes a metal frame 51 on which a groove portion 51A is formed in the Z-direction, and lens holders 52 and 53 slidably attached into the groove portion 51A of the frame 51. The lens 31 of the condenser optical system 3 is fixed into the lens holder 52, while the lens 32 of the condenser optical system 3 being fixed into the lens holder 53. On the other hand, the cylindrical type slide mechanism in FIG. 4 includes cylindrical chassis 54 and 55, on inner peripheral surfaces of which the lenses 31 and 32 are respectively fixed at predetermined positions, and a connecting member 56 whose outer diameter corresponds to an inner diameter of each of the cylindrical chassis 54 and 55. The cylindrical chassis 54 and 55 are slidably attached to both end portions of the connecting member 56.

Next, there will be described an operation of the wavelength selective optical switch having the configuration as described in the above.

Herein, similarly to the conventional technology, provided that a certain wavelength on the ITU grid is made to be the reference wavelength λ0 and the wavelength being ±i-th (i=1, 2, . . . ) to the reference wavelength λ0 is represented by λ±i, consideration is made on the operation for when the WDM light containing the lights of the wavelengths λ0 and λ±i is input to the input port Pin of the input and output optical system 1.

The WDM light input to the input port Pin is converted into a parallel light by the collimator lens, and thereafter, is given to the diffraction grating 2 at the incident angle α. From the diffraction grating 2, the lights of respective wavelengths contained in the WDM light are emitted at different angles to the X-direction in accordance with the formula (1) described above, and then, the emitted lights are sent to the condenser optical system 3. In the condenser optical system 3, the lights of respective wavelengths pass through the lenses 31 and 32 sequentially, to be condensed on the MEMS mirrors respectively corresponding to the respective wavelengths, in the mirror array 3.

Here, provided that a composite focal distance of the two lenses 31 and 32 is fd, this focal distance fd is expressed by the following formula (4), using the focal distances f1 and f2 of the lenses 31 and 32, and a distance d between the lenses 31 and 32.

$$fd = f1 \times f2/(f1+f2-d) \quad (4)$$

From the above formula (4), it is understood that the focal distance fd of the condenser optical system 3 becomes variable by changing the distance d between the two lenses 31 and 32. In the present wavelength selective optical switch, the distance d between the two lenses 31 and 32 can be adjusted by utilizing the slide mechanism, and accordingly, the focal distance fd of the condenser optical system 3 is variable according to the positions in the Z-direction of the lenses 31 and 32.

The beam pitch Xi between the light of the wavelength λ0 and the light of the wavelength λi which are condensed on the mirror array 4 by the condenser optical system 3 as described in the above, is expressed by the formula (5), using the formula (4).

$$Xi = f1 \times f2/(f1+f2-d) \times \{\text{Arc Sin}(N \times \lambda i - \text{Sin } \alpha) - \text{Arc Sin}(N \times \lambda 0 - \text{Sin } \alpha)\} \quad (5)$$

Accordingly, from the above formula (5), it is understood that the beam pitch Xi serves as a function not only for the focal distances f1 and f2 of the lenses 31 and 32, the number of grooves N of the diffraction grating and the incident angle α of the WDM light, but also for the distance d between the lenses 31 and 32. Therefore, even if an error occurs in any of parameters f1, f2, N and α, it becomes possible to correct such an error by changing the distance d between the lenses 31 and 32, so that the beam pitch Xi is made coincident with the mirror pitch X0i of the corresponding MEMS mirror in the mirror array 4.

The adjustment of the distance d between the lenses 31 and 32 utilizing the slide mechanism as described above is simpler compared with the above described case where the rotation mechanism is disposed in the diffraction grating 2 to adjust the incident angle α of the WDM light, and therefore, has an advantage in that the adjustment is easily performed with high accuracy. Further, there is an advantage in that the adjustment precision of the distance d can be changed by changing the setting of the ratio between the focal distances f1 and f2 of the respective lenses. As a specific example relating to the adjustment precision of the distance d, in the case where the number of grooves N of the diffraction grating is 1800 /mm, the incident angle α is 66.5°, the usable wavelength range of the WDM light is C-band (1530 to 1565 nm), the wavelength spacing is 100 GHz, the number of wavelengths is 44 waves, and the ratio between the focal distances f1 and f2 is 1:10, similarly to the conditions described above, the adjustment precision of the distance d required to suppress the degradation of the transmission band to 3 GHz or less is 200 μm or so, and this precision is sufficiently realizable by the slide mechanism as shown in FIG. 3 or FIG. 4.

Further, according to the frame type slide mechanism shown in FIG. 3, the positions of the two lenses 31 and 32 can be adjusted independently. In the case where such a slide mechanism is used, it is possible to correct the beam pitch Xi by moving the lens 32 on the longer focal side, and also to correct a change in a condensing status (beam diameter) on the MEMS mirrors and the deviation between the condensing positions in the Y-direction, which are caused by moving the lens 32, by moving the lens 31 on the shorter focal side. By adjusting the positions in the Z-direction of the lenses 32 and 33, whose focal distances are different from each other, independently, to optimize the positions in the above described manner, it becomes possible to effectively reduce a loss generated in the light of each wavelength which is guided to the desired output port.

Figure 5:
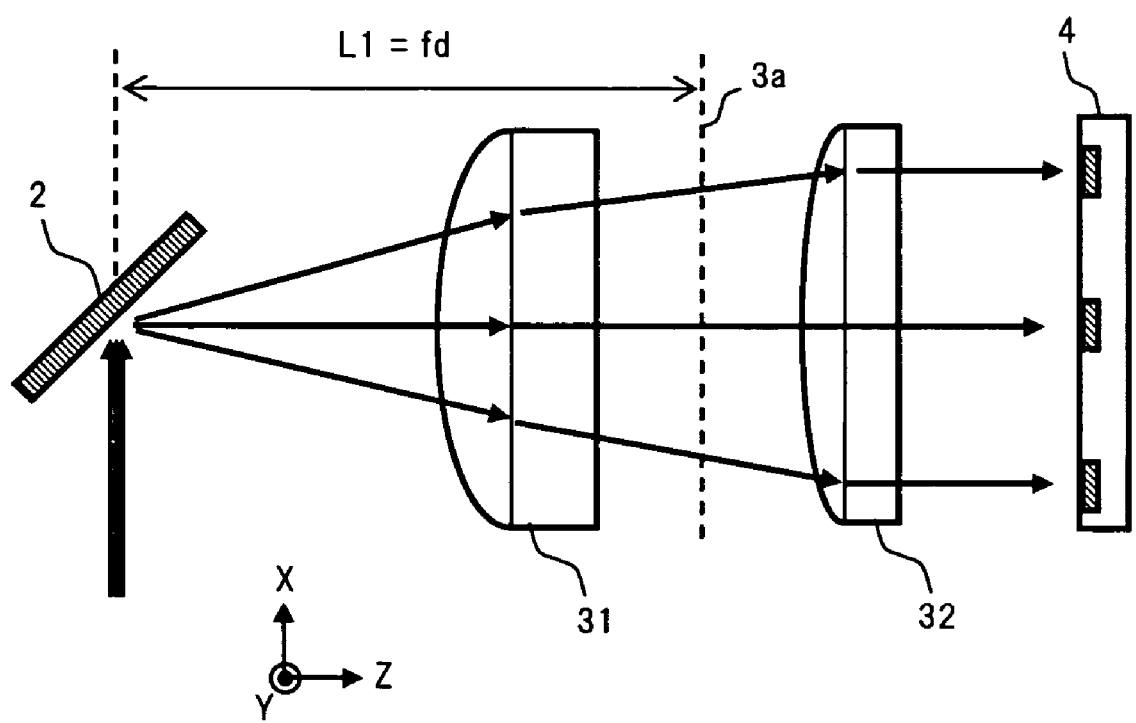
FIG. 5 is a diagram showing a status of when a distance from a diffraction grating to a principal plane of a condenser optical system is made equal to a composite focal distance of the condenser optical system in the embodiment.

Moreover, the distance from the diffraction grating 2 to the condenser optical system 3 is made equal to the focal distance of the entire condenser optical system 3, so that the lights of respective wavelengths condensed by the condenser optical system 3 are incident in parallel to each other on the corresponding MEMS mirrors in the mirror array 4. Therefore, it is desirable to adjust the positions of the lenses 31 and 32 so that such a status is realized. To be specific, as shown in FIG. 5, the positions of the lenses 31 and 32 to the diffraction grating 2 may be adjusted so that a distance L1 from an optical incidence point of the diffraction grating 2 to a principal plane 3$a$ in the combination of the two lenses 31 and 32 becomes equal to the focal distance fd composed by the lenses 31 and 32 which is expressed by the above formula (4).

Figure 6:
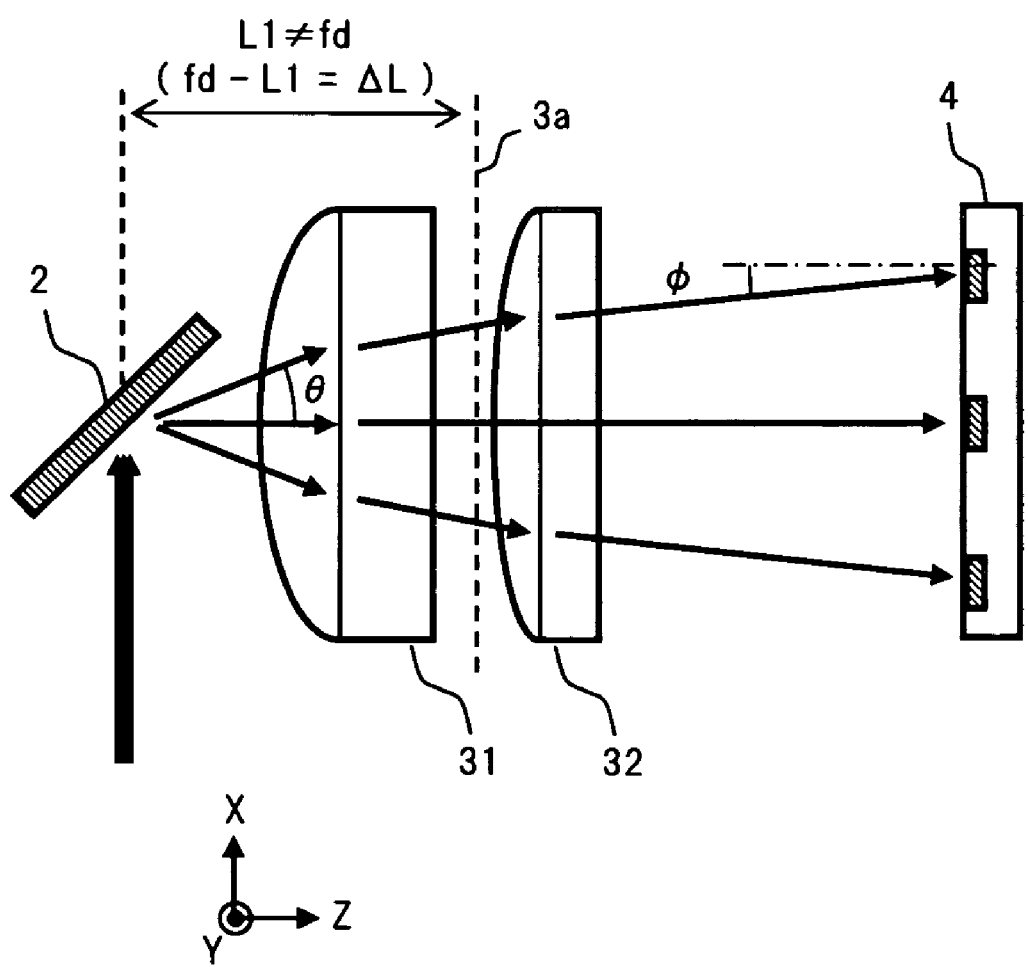
FIG. 6 is a diagram showing a status of when the deviation occurs between the distance from the diffraction grating to the principal plane of the condenser optical system and the composite focal distance of the condenser optical system in the embodiment.

However, for the reasons in mounting or the like, there is the case where the distance L1 from the diffraction grating 2 to the principal plane 3$a$ of the condenser optical system 3 is deviated from the focal distance fd of the entire condenser optical system 3. In this case, as shown in FIG. 6 for example, the incident angles of the lights of respective wavelengths to the MEMS mirrors in the mirror array 4 are different from each other. If deviated angles from the normal incidence are respectively increased, the loss generated in each of the lights guided to the output port is increased. Considering such a status, a deviation amount $\Delta L$ of the distance L1 from the diffraction grating 2 to the principal plane 3$a$ of the condenser optical system 3 with respect to the focal distance fd of the entire condenser optical system 3 needs to satisfy a relationship shown in the following formula (6), provided that the maximum diffraction angle in the diffraction grating 2 is $\theta$ and an allowable range of the deviated angles from the normal incidence of the lights incident on the MEMS mirrors is $\phi$.

$$\Delta L < fd \times \text{Tan } \phi / \text{Tan } \theta \tag{6}$$

Incidentally, the adjustment of the positions in the Z-direction of the two lenses 31 and 32 as described above is basically performed at the assembling time of the present wavelength selective optical switch, and when the optimization of the positions of the lenses 31 and 32 is completed, the lenses 31 and 32 are fixed at the optimized positions. To be specific, the coincidence of the beam pitch with the mirror pitch may be judged, for example, by adjusting the positions of the lenses 31 and 32 while measuring the beam pitch at the condensing positions on the mirror array 4 using an optical detector such as a PD array or the like, or by irradiating the lights of respective wavelengths to the corresponding MEMS mirrors to measure the power of the lights output from the required output ports to thereby adjust the positions of the lenses 31 and 32 so that the measured value becomes maximum, and then, the slide mechanism may be fixed by means of screws or YAG welding and the like, so that the status of the coincidence of the beam pitch with the mirror pitch is maintained.

As described in the above, when the lights of respective wavelengths are condensed on the corresponding MEMS mirrors 41 to 43 in the mirror array 4 by the condenser optical system 3 in which the positions in the Z-direction of the lenses 31 and 32 are optimized, the lights of respective wavelengths are reflected by the MEMS mirrors whose reflecting surface inclination angles are controlled according to the positions in the Y-direction of the output port being the output determination, and optical paths for the lights of respective wavelengths are folded back. Then, the reflected lights from the MEMS mirrors 41 to 43 pass through the condenser optical system 3 and the diffraction grating 2 to be guided to the desired output port.

As described in the above, according to the wavelength selective optical switch of the present embodiment, the condenser optical system 3 is configured by combining the two lenses 31 and 32 whose focal distances are different from each other, to make the positions in the Z-direction of the lenses 31 and 32 adjustable by the slide mechanism. Thus, despite the error in any of the focal distances f1 and f2 of the lenses 31 and 32, the number of grooves N of the diffraction grating and the incident angle $\alpha$ which is determined according to a mounting angle of the diffraction grating 2, the beam pitch between the condensing positions of the lights of respective wavelength can be made coincident with the corresponding mirror pitch in the mirror array 4. As a result, it becomes possible to easily manufacture the wavelength selective optical switch which realizes the excellent transmission band.

Incidentally, in the above embodiment, the description has been made on the example in which the WDM light input to the single input port Pin is separated for each wavelength to be output from the arbitrary output ports Pout1 to Pout3. However, it is also possible to output the lights of respective wavelengths input to arbitrary input ports from a single output port, by reversing the relationship between the input and the output.

Next, there will be described application examples relating to the above embodiment.

Figure 7:
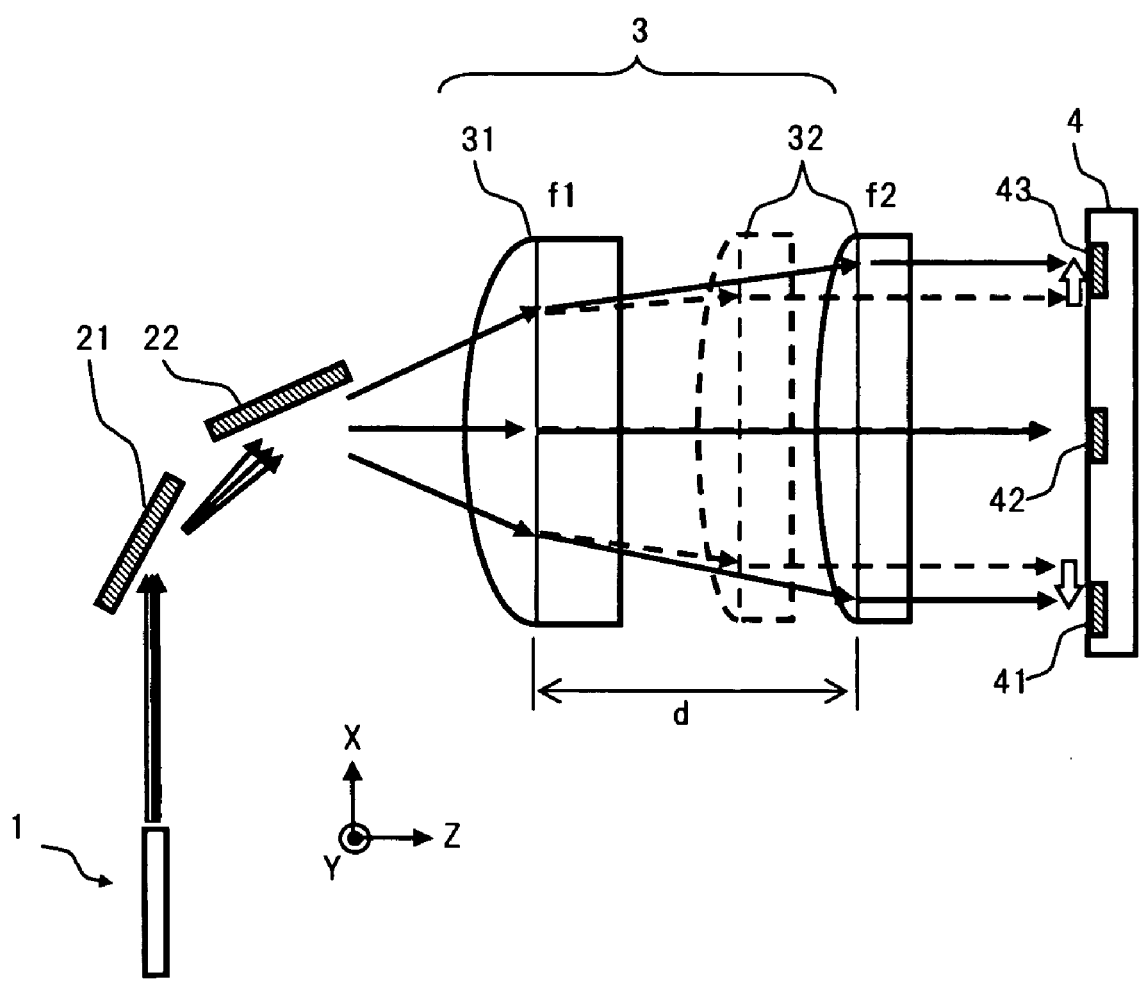
FIG. 7 is a diagram showing a main part configuration of an application example which uses two diffraction gratings relating to the embodiment.

FIG. 7 is a diagram showing an application example of the wavelength selective optical switch in which two diffraction gratings are used.

Figure 13:
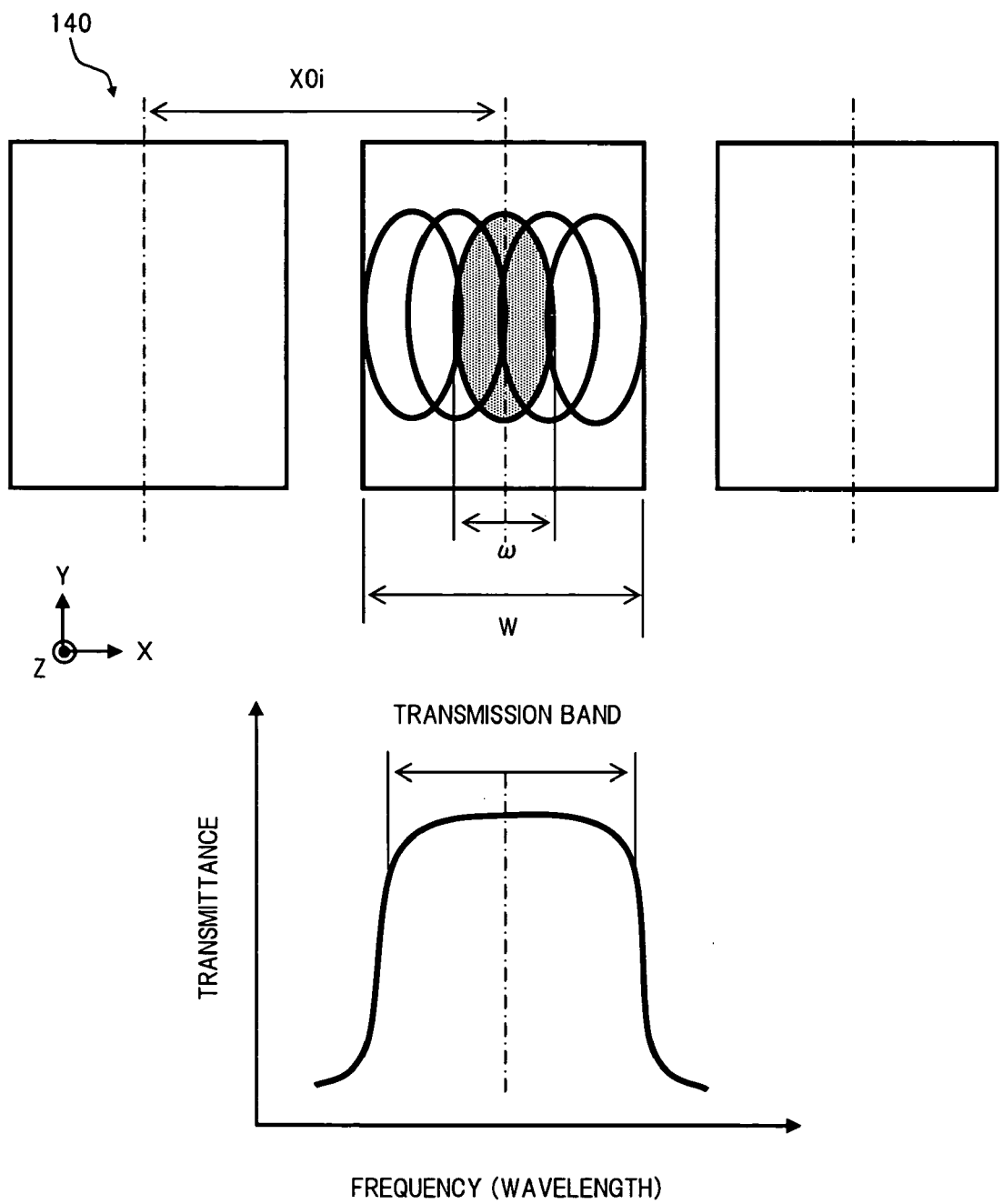
FIG. 13 is a diagram for explaining the transmission band of the wavelength selective optical switch.
Figure 14:
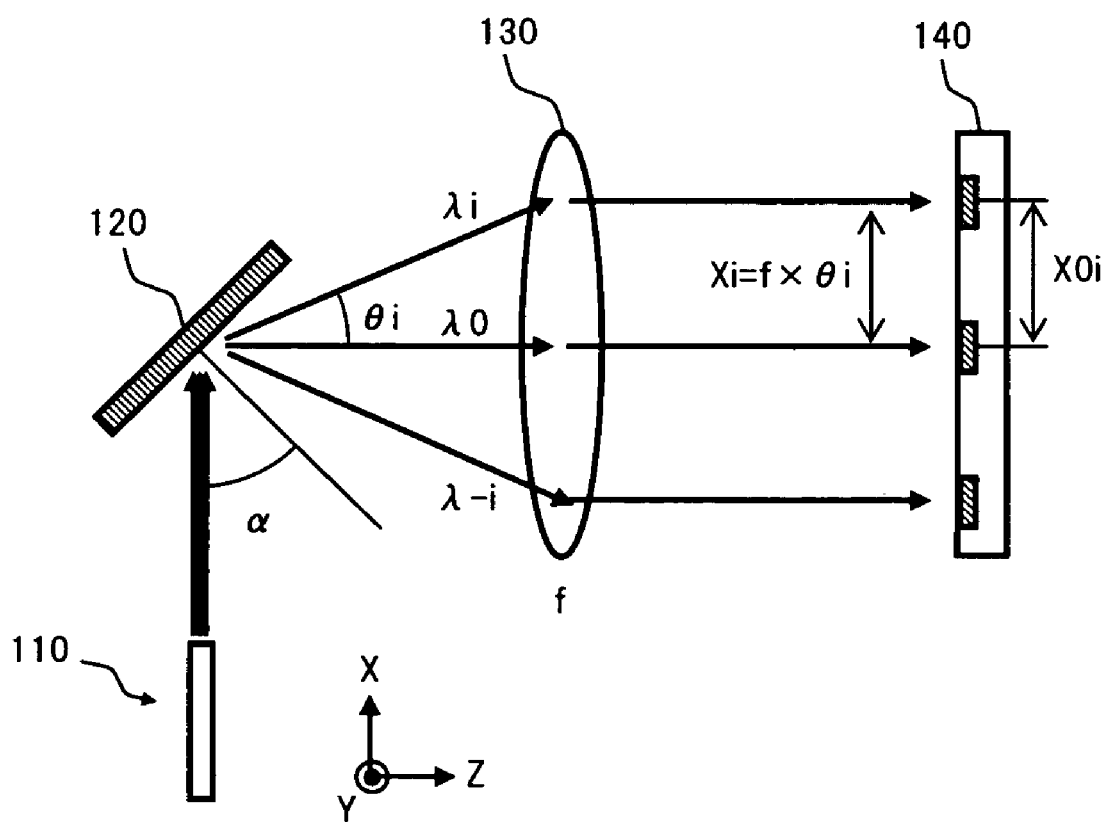
FIG. 14 is a diagram for explaining a relationship between a beam pitch and a mirror pitch in the conventional wavelength selective optical switch.

In this wavelength selective optical switch, the WDM light input to the input port Pin of the input and output optical system 1 is given to two diffraction gratings 21 and 22 sequentially, so that the lights of respective wavelengths are separated to be sent to the condenser optical system 3 similar to that in the above embodiment. By separating the WDM light using the two diffraction gratings, the lights of respective wavelengths are diffracted to the X-direction at angles larger than those in the case where the single diffraction grating is used. Therefore, the mirror pitch between the MEMS mirrors arranged in the mirror array 4 can be made broader. When the mirror pitch is broadened, it becomes possible to increase the width W (refer to FIG. 13) of each MEMS mirror, and as a result, the expansion of the transmission band can be achieved. In the case where a plurality of diffraction gratings is used in such a manner, the mounting precision of each diffraction grating is more strict compared with the case where the single diffraction grating is used. However, in the present wavelength optical switch, as described in the above, since the positions of the lenses 31 and 32 in the condenser optical system 3 can be adjusted to correct the mounting error in each diffraction grating, it is possible to easily realize the mounting of the plural diffraction gratings.

Figure 8:
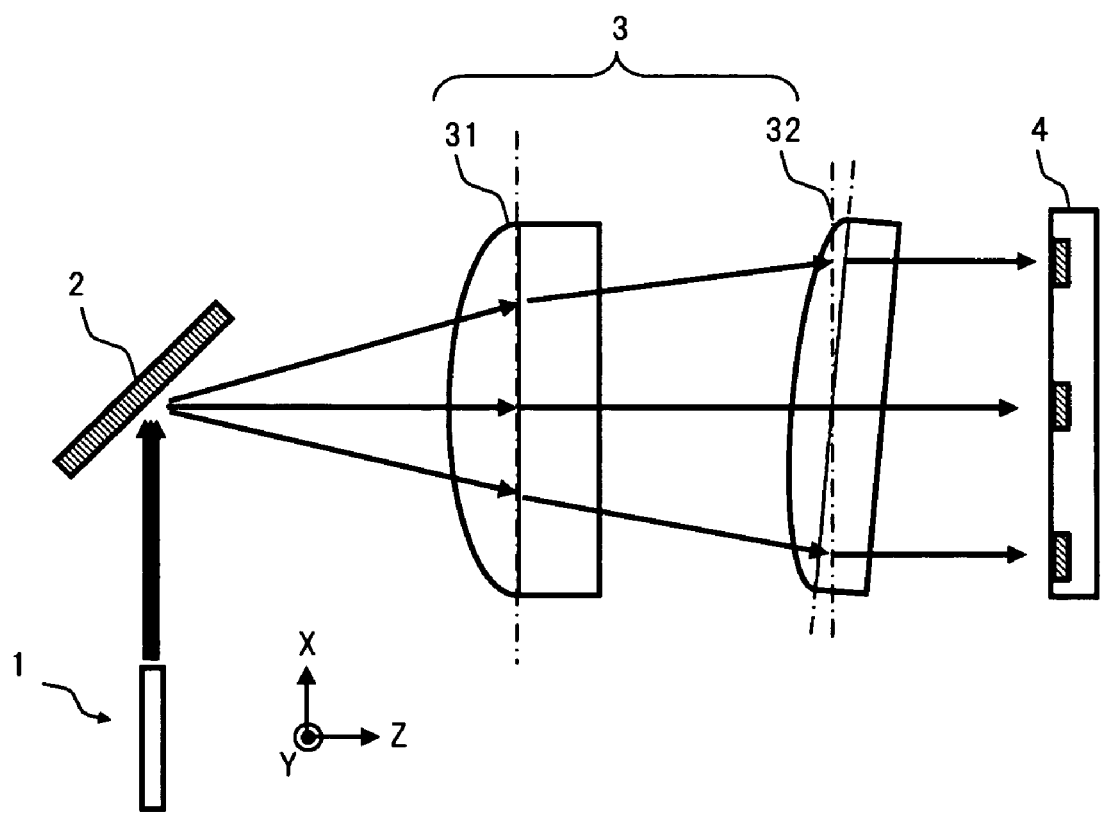
FIG. 8 is a diagram showing a main part configuration of an application example in which a lens in the condenser optical system is inclined.

FIG. 8 is a diagram showing an application example of the wavelength selective optical switch in which the lens in the condenser optical switch is arranged to be inclined.

Generally, in the case where the condenser optical system is configured by combining a plurality of lenses, there is a possibility that the light is multi-reflected between the lenses or between the lens and another optical part due to a shape of each lens or a distance between the lenses, to degrade the characteristics of the wavelength selective optical switch. In order to avoid the degradation of the characteristics due to such multi-reflection, in the wavelength selective optical switch of FIG. 8, for example, the lens 32 in the condenser optical system 3 is arranged to be inclined to an opposite face of the lens 31 in the condenser optical system 31. As a result, it is avoided that the multi-reflection of the light between the lens 31 and the lens 32, and between the lens 32 and the mirror array 4. Therefore, it becomes possible to stably achieve the excellent characteristics.

Figure 9:
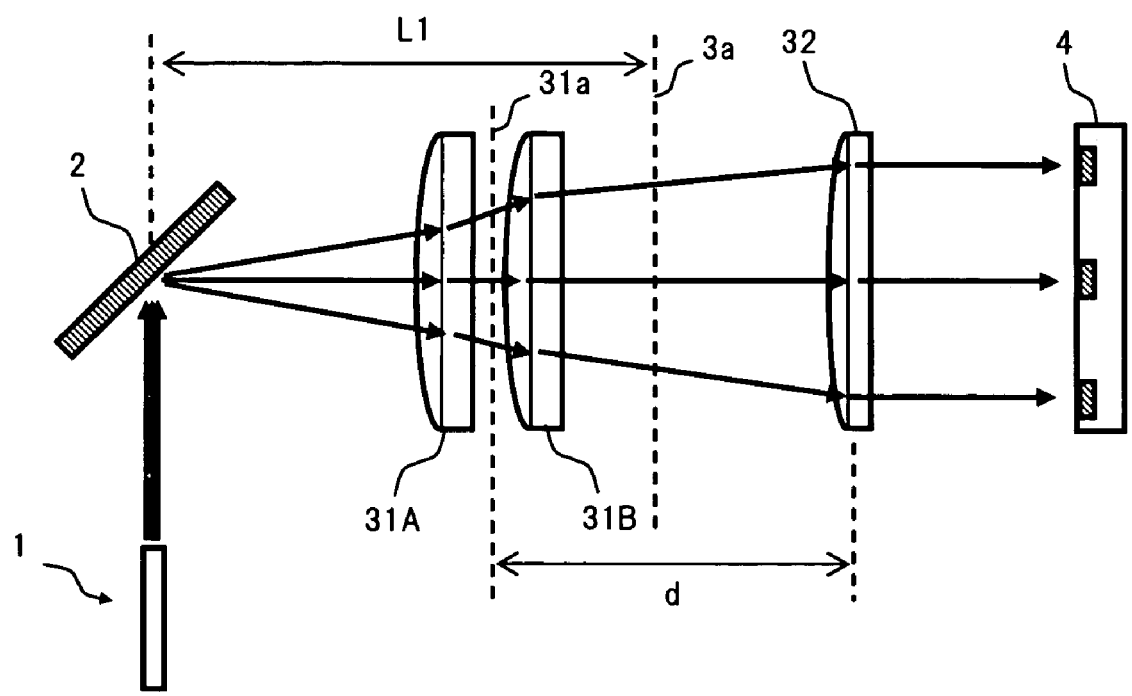
FIG. 9 is a diagram showing a main part configuration of an application example in which the condenser optical system is configured by combining three lenses relating to the embodiment.

FIG. 9 is a diagram showing an application example of the wavelength selective optical switch in which the condenser optical system is configured by combining three lenses.

In this wavelength selective optical switch, the function equivalent to that of the lens 31 on the shorter focal side in the configuration of the above embodiment is realized by combining two lenses 31A and 31B. In the case where the condenser optical system is configured using the three lenses 31A, 31B and 32 in this manner, consideration is made on a principal plane 31a in the combination of the lenses 31A and 31B, to set a distance between the principal plane 31a and the lens 32 to d, and consideration is made on the principal plane 3a in the combination of the three lenses 31A, 31B and 32, to set a distance from the optical incidence point of the diffraction grating 2 to the principal plane 3a to L1, so that the adjustment in the Z-direction of the lenses 31A, 31B and 32 can be performed, similarly to the case where the condenser optical system is configured using the two lenses. Further, with regard to focal distances of the lenses 31A, 31B and 32, it is preferable that the focal distance f2 of the lens 32 is set to be 5 times or more a composite focal distance f1' of the lenses 31A and 31B.

Incidentally, here, the application example has been shown in which the condenser optical system is configured by combining the three lenses. However, based on the concept similar to the above, it is also possible to adopt, an application in which the condenser optical system is configured by combining four or more lenses.

Figure 10:
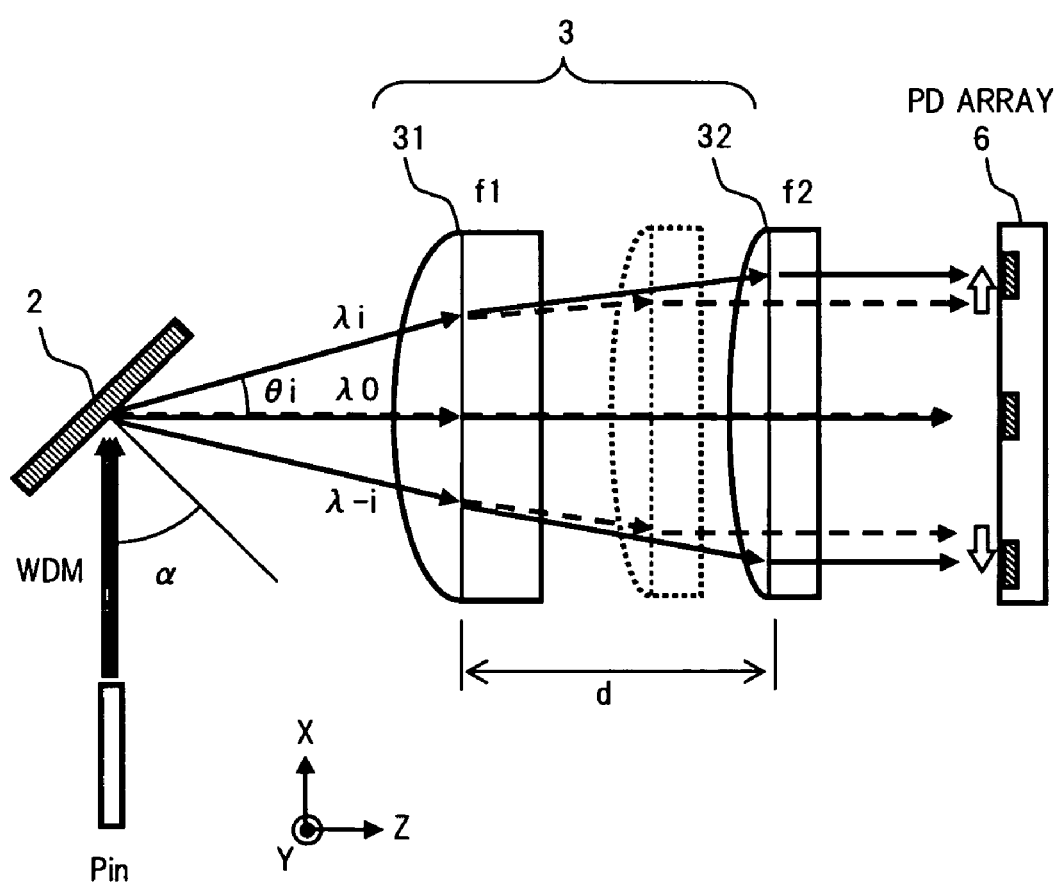
FIG. 10 is a diagram showing a main part configuration of an application example in which a PD array is arranged, in place of a mirror array, to configure an optical spectrum monitor relating to the embodiment.
Figure 11:
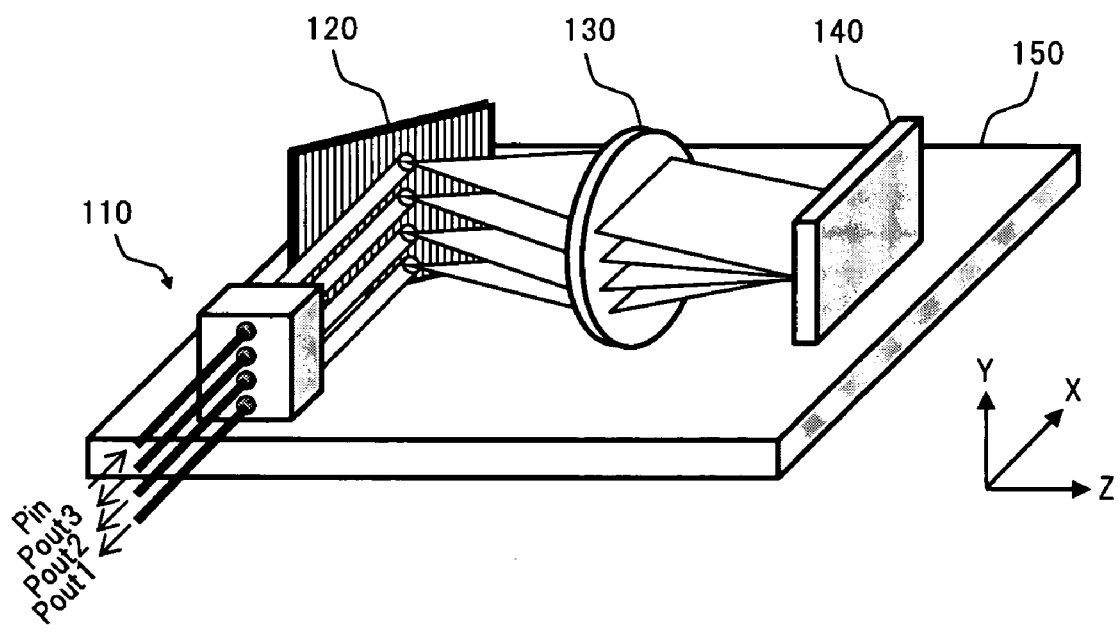
FIG. 11 is a perspective view showing a configuration of a conventional wavelength selective optical switch.
Figure 12:
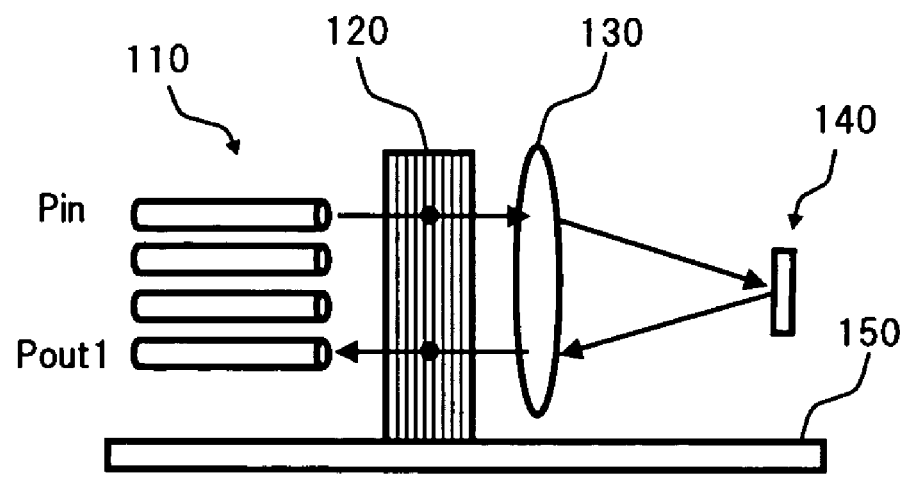
FIG. 12 is a diagram for explaining an operation of the conventional wavelength selective optical switch.
Figure 12:
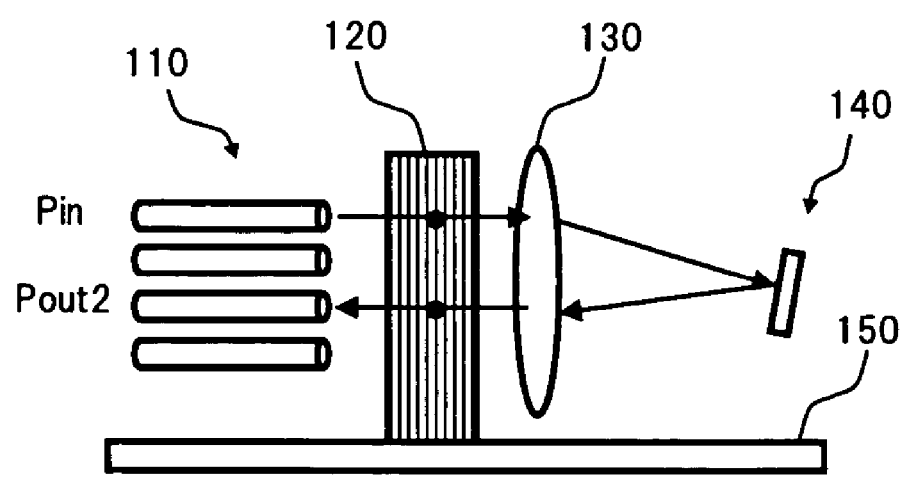

FIG. 10 is a diagram showing an application example in which a PD array is arranged in place of the mirror array, to configure an optical spectrum monitor.

In this application example, the diffraction grating 2 and the condenser optical system 3 in the above embodiment are used just as they are, and in place of the mirror array 4, a PD array 6 including a plurality of optical detectors whose light receiving surfaces are arranged on the condensing positions of the lights of respective wavelengths. In such a configuration, the WDM light input to the input port Pin is separated for each wavelengths by the diffraction grating 2, and thereafter, the lights of respective wavelengths pass through the condenser optical system 3 to be condensed on the light receiving surfaces of the optical detectors corresponding to the respective wavelengths, in the PD array 6, and the intensity of each of the lights of respective wavelengths is detected by each of the optical detectors. As a result, it becomes possible to realize the optical spectrum monitor.

Incidentally, here, there has been shown the example in which the PD array 6 is disposed in place of the mirror array 4, to configure the optical spectrum monitor. However, optical devices having functions other than that of the optical spectrum monitor can be applied to the diffracting grating 2 and the condenser optical system 3 in the above embodiment. For example, if an end of an output fiber is arranged on the condensing positions of the lights of respective wavelengths, a demultiplexer can be configured.

What is claimed is:

1. A wavelength selective optical switch, comprising:
an input and output optical system in which an input port and a plurality of output ports are arranged in a first direction;
a spectral element which separates a wavelength division multiplexed light containing a plurality of lights of different wavelengths, which is emitted from the input port in said input and output optical system, according to the wavelengths, to a second direction which is different from said first direction;
a condenser optical system which condenses the lights of respective wavelengths separated by said spectral element on different positions; and
a mirror array including a plurality of movable mirrors whose angular variable reflecting surfaces are arranged on the condensing positions of the lights of respective wavelengths condensed by said condenser optical system, in which angles of the reflecting surfaces of said movable mirrors are controlled, so that the lights of respective wavelengths reflected by said respective movable mirrors are guided, via said condenser optical system and said spectral element, to the output ports which correspond to the lights of respective wavelengths, among the plurality of output ports in said input and output optical system,
wherein said condenser optical system includes a plurality of lenses whose focal distances are different from each other, and is provided with a slide mechanism which makes at least one of said plurality of lenses movable in parallel to an optical axis direction which is orthogonal to said first and second directions, so that the lights of respective wavelengths have a beam pitch on the condensing positions thereof that coincides with a mirror pitch of the movable mirrors of said mirror array.

2. A wavelength selective optical switch according to claim 1,
wherein said condenser optical system is configured by combining two lenses, and a focal distance of one of the lenses is 5 times or more a focal distance of the other lens.

3. A wavelength selective optical switch according to claim 2,
wherein said slide mechanism makes at least the lens on the longer focal side in said two lenses movable in parallel to said optical axis direction.

4. A wavelength selective optical switch according to claim 2,
wherein the lens on the shorter focal side in said condenser optical system is a lens having a spherical aberration corrected.

5. A wavelength selective optical switch according to claim 1, wherein said condenser optical system is configured by combining three or more lenses, and a focal distance of the lens having the longest focal distance among said three lenses is 5 times or more a composite focal distance of the remaining lenses.

6. A wavelength selective optical switch according to claim 5, wherein said slide mechanism makes the lens having the longest focal distance among said three lenses movable in parallel to said optical axis direction.

7. A wavelength selective optical switch according to claim 1, wherein said spectral element is configured by combining two or more diffracting gratings.

8. A wavelength selective optical switch according to claim 1, wherein at least one of said plurality of lenses in said condenser optical system is arranged to be inclined to the remaining lenses.

9. A wavelength selective optical switch according to claim 1, wherein a distance from said spectral element to a principal plane of said plurality of lenses in said condenser optical system is equal to a composite focal distance of said plurality of lenses.

10. A wavelength selective optical switch according to claim 1, wherein, when a difference between a distance from said spectral element to a principal plane of said plurality of lenses in said condenser optical system and a composite focal lens of said plurality of lenses is $\Delta L$, provided that the composite focal distance of said plurality of lenses is fd, the maximum deflection angle in said spectral element is $\theta$, and an allowable range of deviated angles from the normal incidence of the lights incident on said movable mirrors is $\phi$, the difference $\Delta L$ is within a range of $\Delta L < fd \times \tan \phi / \tan \theta$.

11. An optical device comprising:
   a spectral element which separates a wavelength division multiplexed light containing a plurality of lights of different wavelengths, which is emitted from an input port, according to the wavelengths, to a first direction; and
   a condenser optical system which condenses the lights of respective wavelengths separated by said spectral element on different positions,
   wherein said condenser optical system includes a plurality of lenses whose focal distances are different from each other, and is provided with a slide mechanism which makes at least one of said plurality of lenses movable in parallel to an optical axis direction which is orthogonal to said first direction, so that the lights of respective wavelengths have a beam pitch on the condensing positions thereof that coincides with a mirror pitch of the movable mirrors of said mirror array.

12. An optical device according to claim 11, wherein a plurality of optical detectors, whose light receiving surfaces are arranged on the condensing positions of the light of respective wavelengths condensed by said condenser optical system, is provided, and the spectrum of said wavelength division multiplexed light is monitored using the intensity of each of the lights of respective wavelengths detected by each of said optical detector.

13. A wavelength selective optical switch comprising:
   a spectral element which separates a wavelength division multiplexed light containing a plurality of lights of different wavelengths into lights of respective wavelengths;
   a condenser optical system which condenses the lights of respective wavelengths separated by the spectral element at different positions; and
   a mirror array including a plurality of movable mirrors whose angular variable reflecting surfaces are arranged at the condensing positions of the lights of respective wavelengths condensed by said condenser optical system,
   wherein said condenser optical system includes a plurality of lenses, and is provided with a slide mechanism to move one of said plurality of lenses, in parallel to an optical axis direction, so that the lights of respective wavelengths have a beam pitch of the condensing positions thereof that coincides with a mirror pitch of the movable mirrors of said mirror array.

14. A wavelength selective optical switch, comprising:
   an input and output optical system in which a plurality of input ports and an output port are arranged in a first direction;
   a spectral element which separates a wavelength division multiplexed light containing a plurality of lights of different wavelengths, which is emitted from the input ports in said input and output optical system, according to the wavelengths, to a second direction which is different from said first direction;
   a condenser optical system which condenses the lights of respective wavelengths separated by said spectral element on different positions; and
   a mirror array including a plurality of movable mirrors whose angular variable reflecting surfaces are arranged on the condensing positions of the lights of respective wavelengths condensed by said condenser optical system, in which angles of the reflecting surfaces of said movable mirrors are controlled, so that the lights of respective wavelengths reflected by said respective movable mirrors are guided, via said condenser optical system and said spectral element, to the output port in said input and output optical system,
   wherein said condenser optical system includes a plurality of lenses whose focal distances are different from each other, and is provided with a slide mechanism which makes at least one of said plurality of lenses movable in parallel to an optical axis direction which is orthogonal to said first and second directions, so that the lights of respective wavelengths have a beam pitch on the condensing positions thereof that coincides with a mirror pitch of the movable mirrors of said mirror array.

15. A wavelength selective optical switch according to claim 14, wherein said condenser optical system is configured by combining two lenses, and a focal distance of one of the lenses is 5 times or more a focal distance of the other lens.

16. A wavelength selective optical switch according to claim 15, wherein said slide mechanism makes at least the lens on the longer focal side in said two lenses movable in parallel to said optical axis direction.

17. A wavelength selective optical switch according to claim 15, wherein the lens on the shorter focal side in said condenser optical system is a lens having a spherical aberration corrected.

18. A wavelength selective optical switch according to claim 14, wherein said condenser optical system is configured by combining three or more lenses, and a focal distance of the lens having the longest focal distance among said three lenses is 5 times or more a composite focal distance of the remaining lenses.

19. A wavelength selective optical switch according to claim 18, wherein said slide mechanism makes the lens having the longest focal distance among said three lenses movable in parallel to said optical axis direction.

20. A wavelength selective optical switch according to claim 14, wherein said spectral element is configured by combining two or more diffracting gratings.

21. A wavelength selective optical switch according to claim 14, wherein at least one of said plurality of lenses in said condenser optical system is arranged to be inclined to the remaining lenses.

22. A wavelength selective optical switch according to claim 14, wherein a distance from said spectral element to a principal plane of said plurality of lenses in said condenser optical system is equal to a composite focal distance of said plurality of lenses.

23. A wavelength selective optical switch according to claim 14, wherein, when a difference between a distance from said spectral element to a principal plane of said plurality of lenses in said condenser optical system and a composite focal lens of said plurality of lenses is $\Delta L$, provided that the composite focal distance of said plurality of lenses is $fd$, the maximum deflection angle in said spectral element is $\theta$, and an allowable range of deviated angles from the normal incidence of the lights incident on said movable mirrors is $\phi$, the difference $\Delta L$ is within a range of $\Delta L < fd \times \tan\phi / \tan\theta$.

* * * * *

UNITED STATES PATENT AND TRADEMARK OFFICE
CERTIFICATE OF CORRECTION

PATENT NO.        : 7,330,617 B2                                                Page 1 of 1
APPLICATION NO.   : 11/320973
DATED             : February 12, 2008
INVENTOR(S)       : Hirofumi Aota et al.

It is certified that error appears in the above-identified patent and that said Letters Patent is hereby corrected as shown below:

Column 14, Line 57, change "AL," to --$\Delta$L,--.

Signed and Sealed this

Eighth Day of July, 2008

JON W. DUDAS
*Director of the United States Patent and Trademark Office*